US011681880B2

(12) United States Patent
Sawal et al.

(10) Patent No.: US 11,681,880 B2
(45) Date of Patent: Jun. 20, 2023

(54) AUTO TRANSFORMATION OF NETWORK DATA MODELS USING NEURAL MACHINE TRANSLATION

(71) Applicant: DELL PRODUCTS L.P., Round Rock, TX (US)

(72) Inventors: Vinay Sawal, Fremont, CA (US); Brian Gerard Pierce, San Jose, CA (US); Geetha Sekar, San Ramon, CA (US); Bernard Sarpong Duffour, San Jose, CA (US); Eric Edward Peter Seifert, Carmichael, CA (US); Srividhya Nadhadhur Murali, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 248 days.

(21) Appl. No.: 16/923,044

(22) Filed: Jul. 7, 2020

(65) Prior Publication Data
US 2022/0012433 A1 Jan. 13, 2022

(51) Int. Cl.
*G06F 40/58* (2020.01)
*G06N 3/04* (2023.01)
*G06N 3/02* (2006.01)
*G06F 40/47* (2020.01)

(52) U.S. Cl.
CPC ............ *G06F 40/58* (2020.01); *G06F 40/47* (2020.01); *G06N 3/02* (2013.01); *G06N 3/04* (2013.01)

(58) Field of Classification Search
CPC .......... G06F 40/58; G06F 40/47; G06N 3/02; G06N 3/04
See application file for complete search history.

(56) References Cited

U.S. PATENT DOCUMENTS

| 10,346,548 | B1 * | 7/2019 | Wuebker | G06F 40/58 |
|---|---|---|---|---|
| 2017/0127016 | A1 * | 5/2017 | Yu | G06V 10/82 |
| 2017/0323203 | A1 * | 11/2017 | Matusov | G06F 16/1794 |
| 2020/0073947 | A1 * | 3/2020 | Bertoldi | G06F 40/47 |
| 2022/0012433 | A1 * | 1/2022 | Sawal | G06F 40/14 |

* cited by examiner

*Primary Examiner* — Samuel G Neway
(74) *Attorney, Agent, or Firm* — North Weber & Baugh LLP (57) ABSTRACT

Described herein are systems and methods for neural machine translation (NMT) of languages between network operation systems. The languages may be a query language, such as a XML path, to navigate through elements and attributes in an XML document. An NMT model comprises an encoder and a decoder to implement the machine translation. The encoder encodes a source sentence as a sequence of encoder hidden states. The decoder may incorporate attention mechanism to generate a target sentence, conditioned on the encoder hidden states. The NMT model may also use a modified beam search with variable beam width and search scope for each search step to speed up search process with a balance of accuracy and processing cost. Evaluation results demonstrate that embodiments of the present disclosure may be used in a recommender system for XPath auto-generation between different network operation systems.

20 Claims, 6 Drawing Sheets

|          | bgp-router | vrf | Peer-config | ipv4 | Remote-addr | activate |
|----------|------------|-----|-------------|------|-------------|----------|
| oc-bgp:bgp |          |     |             |      |             |          |
| neighbors  |          |     |             |      |             |          |
| neighbor   |          |     |             |      |             |          |
| afi-safis  |          |     |             |      |             |          |
| afi-safi   |          |     |             |      |             |          |
| config     |          |     |             |      |             |          |
| enabled    |          |     |             |      |             |          |

AUTO TRANSFORMATION OF NETWORK DATA MODELS USING NEURAL MACHINE TRANSLATION

BACKGROUND

The present disclosure relates generally to machine translation. More particularly, the present disclosure relates to machine translation of network data.

Internal states of networking device may be represented in multiple ways. Many standard organizations and trade consortiums are competing for defining the schema. No clear winner has immerged. For example, a multitude of Yang models have been created by various entities to represent effectively the same set of attributes. Yang models are used in various examples including IETF models, Openconfig models, Redfish models, and some vendor models.

Network device vendor needs to implement create, read, update, and delete (CRUD) operations via North-bound interfaces to support protocols that employ above-mentioned Yang schema. For example, in order to support gRPC (Remote Procedure Calls) Network Management Interface (gNMI) protocol, vendor Network Operating System (NOS) may need to support Openconfig models.

Some vendors may have implemented the network constructs using their own proprietary NOS models, which might be quite different from Openconfig models. This discrepancy requires a transformation module in vendor NOS that converts an external Yang Extensible Markup Language (XML) path language (XPath) to an internal Yang XPath.

To implement the model-to-model transformation logic, vendor NOS developer typically need to manually map external XPath to internal XPath. However, this manual mapping process is very time consuming and accuracy of manual mapping may also be negatively impacted. Manual mapping requires domain knowledge of underlying protocol and knowledge of how the module is implemented in a vendor NOS. There are dozens of network modules and each network module may have thousands of attributes. For example, an Openconfig border gateway protocol (BGP) model has more than 1,000 unique attributes, not including augmentation.

Accordingly, it is highly desirable to find new, more efficient ways to automatically generate mappings between different models.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of automatic transformation of network data models, aspects of the present disclosure are not so limited. Accordingly, the aspects of the present disclosure may be applied or adapted for use in other contexts.

1. Embodiments of Neural Machine Translation

Internal states of networking device may be represented in multiple ways. Many standard organizations and trade consortiums are competing for defining the schema. No clear winner has immerged. For example, a multitude of Yang models have been created by various entities to represent effectively the same set of attributes. Yang models are used in various examples including IETF models, Openconfig models, Redfish models, and some vendor models.

Network device vendor needs to implement create, read, update, and delete (CRUD) operations via North-bound interfaces to support protocols that employ above-mentioned Yang schema. For example, in order to support gRPC (Remote Procedure Calls) Network Management Interface (gNMI) protocol, vendor Network Operating System (NOS) may need to support Openconfig models.

However, some vendors may have implemented the network constructs using their own proprietary NOS models, which might be quite different from Openconfig models. Table 1 below shows an example of Openconfig Extensible Markup Language (XML) path language (XPath) and Dell OS10 XPath. Such a discrepancy requires a transformation module in vendor NOS that converts between external Yang XPaths and internal Yang XPaths.

TABLE 1

Example Openconfig XPaths and Dell OS10 XPaths

| Openconfig XPath | Dell OS10 XPath |
|---|---|
| oc-stp/stp/global/config/enabled-protocol | dell-xstp:config/system-params/mode |
| oc-bfd/interfaces/interface/peers/peer/state/local-address | dell-bfd:session-state/source-ip |
| oc-if/interfaces/interface/subinterfaces/subinterface/aggregation/switched-vlan/config/trunk-vlans | cms-interface-backptr/interface-in-running/tagged-vlans |

To implement the model-to-model transformation logic, a vendor NOS developer may need to manually map external XPath to internal XPath, or vice versa. The mapping may result in a 1:1, 1:N or N:1 relationship between the external/internal XPaths. Typically, a majority, e.g., 90%+, of such mappings are 1:1.

However, this manual mapping process may be very time consuming and consequently, accuracy of manual mapping may be negatively impacted. Manual mapping requires domain knowledge of underlying protocol and knowledge of how the module is implemented in a vendor NOS. There are dozens of network modules and each network module may have thousands of attributes. For example, an Openconfig border gateway protocol (BGP) model has more than 1,000 unique attributes not including augmentation.

In one or more embodiments of the present disclosure, the aforementioned XPaths mapping between two arbitrary Yang models may be modelled as a Machine Translation (MT) task in Natural language processing (NLP). Input to the MT engine may be one or more paths in a first NOS model, e.g., Openconfig, that are transformed to corresponding paths in second NOS model, e.g., Dell OS10, as an output.

Figure 1:
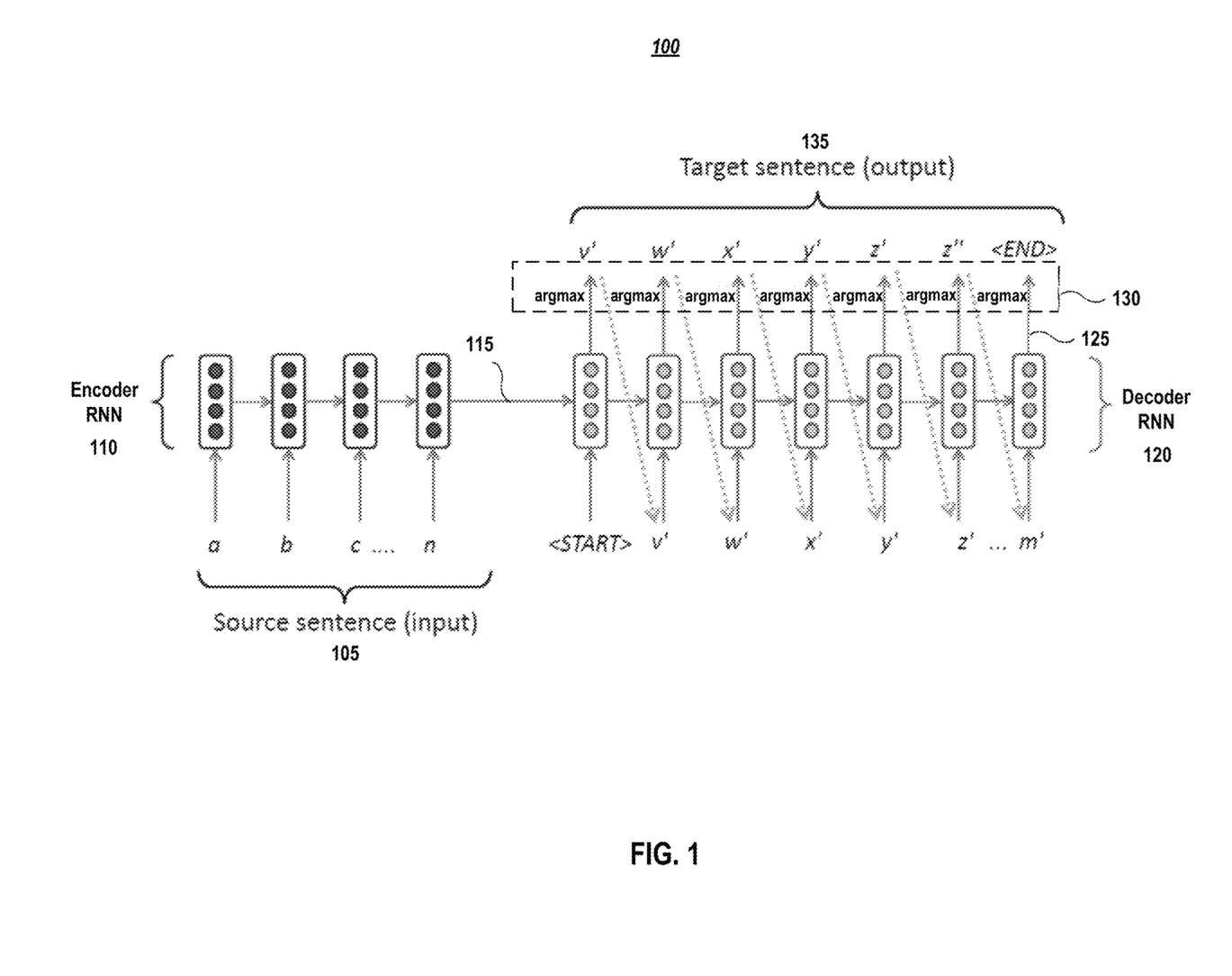
FIG. 1 ("FIG. 1") depicts a neural machine translation (NMT) model layout, according to embodiments of the present disclosure.

FIG. 1 depicts a neural machine translation (NMT) model layout, according to embodiments of the present disclosure. The NMT model comprises an encoder recurrent neural network (RNN) 110 and a decoder RNN 120. In one or more embodiments, the encoder RNN is a bidirectional Long Short-Term Memory (LSTM) network to encode a source sentence, phrase, or expression 105 as a sequence of encoder hidden states 115. In one or more embodiments, the decoder RNN 120 is a unidirectional LSTM network that operates over the target sentence and attends to the encoder hidden states to produce a sequence of decoder hidden states 125. In one or more embodiments, the decoder RNN is a Language Model to generate a target sentence, conditioned on encoder hidden states. In one or more embodiments, the NMT model further comprises an output prediction layer 130, which may be a linear layer with softmax to produce a probability distribution for the next target word on each decoder time-step. Based on the produced probability distribution, a target sentence, phrase, or expression 135 may finally be generated.

In one or more embodiments, a source or target sentence, phrase, or expression may comprise one or more words or symbols. In one or more embodiments, a symbol may be a special character, a space, an uppercase letter, a lowercase letter, etc. One or more symbols may be used to identify hierarchical levels for a section of the source or target sentence, phrase, or expression. In one or more embodiments, given a source expression with a source hierarchical structure, including source structural and syntax adherence, a mapping or translation process should generate a corresponding hierarchical structure, with its corresponding target structural and syntax adherence, in a target expression such that the target expression is a valid translation or mapping that can be executed. In one or more embodiments, the target structural and syntax adherence may or may not have similar layout as the source structural and syntax adherence. For example, a source expression may use one or more "/" symbols to identify a source hierarchical structure, while a target expression may also use the same "/" symbol, or use a different symbol or symbols, e.g., "//" or "\", etc., to identify a target hierarchical structure in the target expression. In one or more embodiments, the target hierarchical structure may or may not have the same order for hierarchical level as the source hierarchical structure. For example, a source expression "a/b/c" may mean "a" as the highest hierarchical level, "b" as the middle hierarchical level and "c" for the lowest hierarchical level. A corresponding target expression for a target model may be expressed as "C/B/A" with "C" as the lowest hierarchical level listing in the front, according to syntax requirement of the target model. Depending on the source model and target model, the first word in a target expression may or may not correspond to the first word in a source expression.

In one or more embodiments, the source sentence may be an input Yang XPath (i.e., Openconfig Yang XPath). Such an XPath is a sequence of words delimited by '/' and converted into word token a, b, c, . . . , n at each time-step. For example, the input XPath may be "oc-stp/stp/global/config/enabled-protocol", while the corresponding tokenized input may be "oc-stp", "stp", "global", "config", "enabled-protocol". At each time-step, word tokens are fed into the encoder RNN, e.g., a bidirectional LSTM, which encodes features of input vector into a hidden state. The hidden state is fed as input to next LSTM along with the word token in that time-step. This process continues until a final encoding vector that captures all the features of the input sentence is reached. This final vector is fed to decode RNN whose structure may be similar to that of encoder RNN. In the decoder RNN, the first time-step LSTM may use special token '<Start>' as the input along with final vector from Encoder RNN to generate a prediction and a hidden state. Predicted word and hidden state from previous time-step is fed to current time-step. This process continues until the last predicted word is obtained.

After all decoder time-steps, a target sentence, e.g., a Dell OS10 Yang XPath, is generated. Since the output prediction layer produces a probability distribution, there is an option to generate a top prediction target sentence or top 3 predicted target sentences or any arbitrary n predictions. Given the aforementioned exemplary input Openconfig XPath "oc-bgp:bgp/neighbors/neighbor/afi-safis/afi-safi/config/enabled", the top 3 predicted target Dell OS10 Yang XPaths may be:

XPath 1: "dell:bgp-router/vrf/peer-config/ipv4/remote-address/activate";

XPath 2: "dell:bgp-router/vrf/peer-config/ipv6/remote-address/activate";

XPath 3: "dell:bgp-router/peer-config/ipv4/remote-address/activate".

In one or more embodiments, the NMT model is a Sequence-to-Sequence (Seq2Seq) model with attention mechanism, which allows the decoder to focus on certain parts of the input sentence thus improving performance of the NMT model. For the NMT model with attention mechanism, each decoder hidden state attends to all the encoder hidden states. Given a set of encoder hidden states and a decoder hidden state, a weighted sum of the encoder hidden states are computed dependent on the decoder hidden state.

Figure 2:
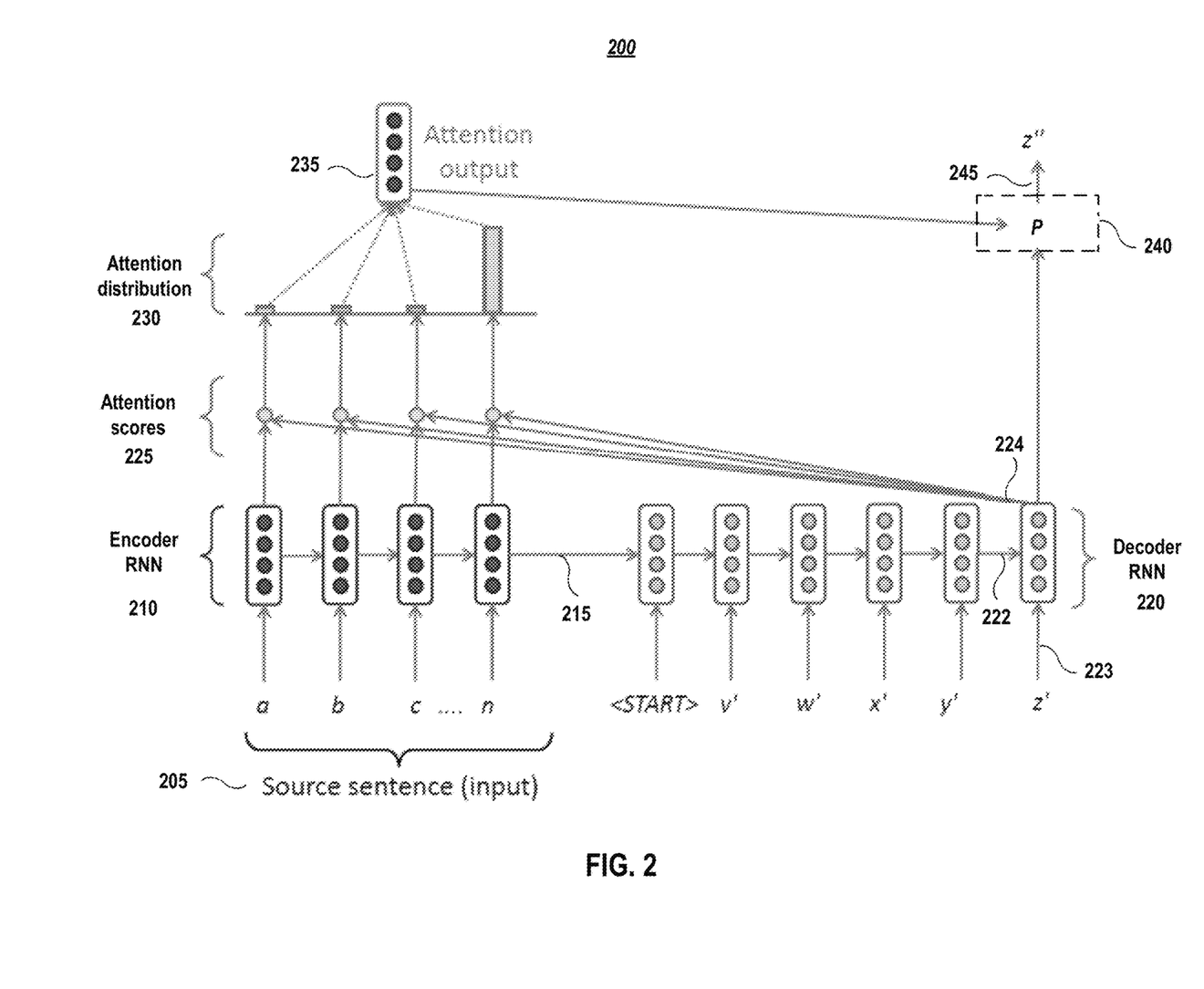
FIG. 2 depicts an NMT model incorporated with attention mechanism, according to embodiments of the present disclosure.
Figure 3:
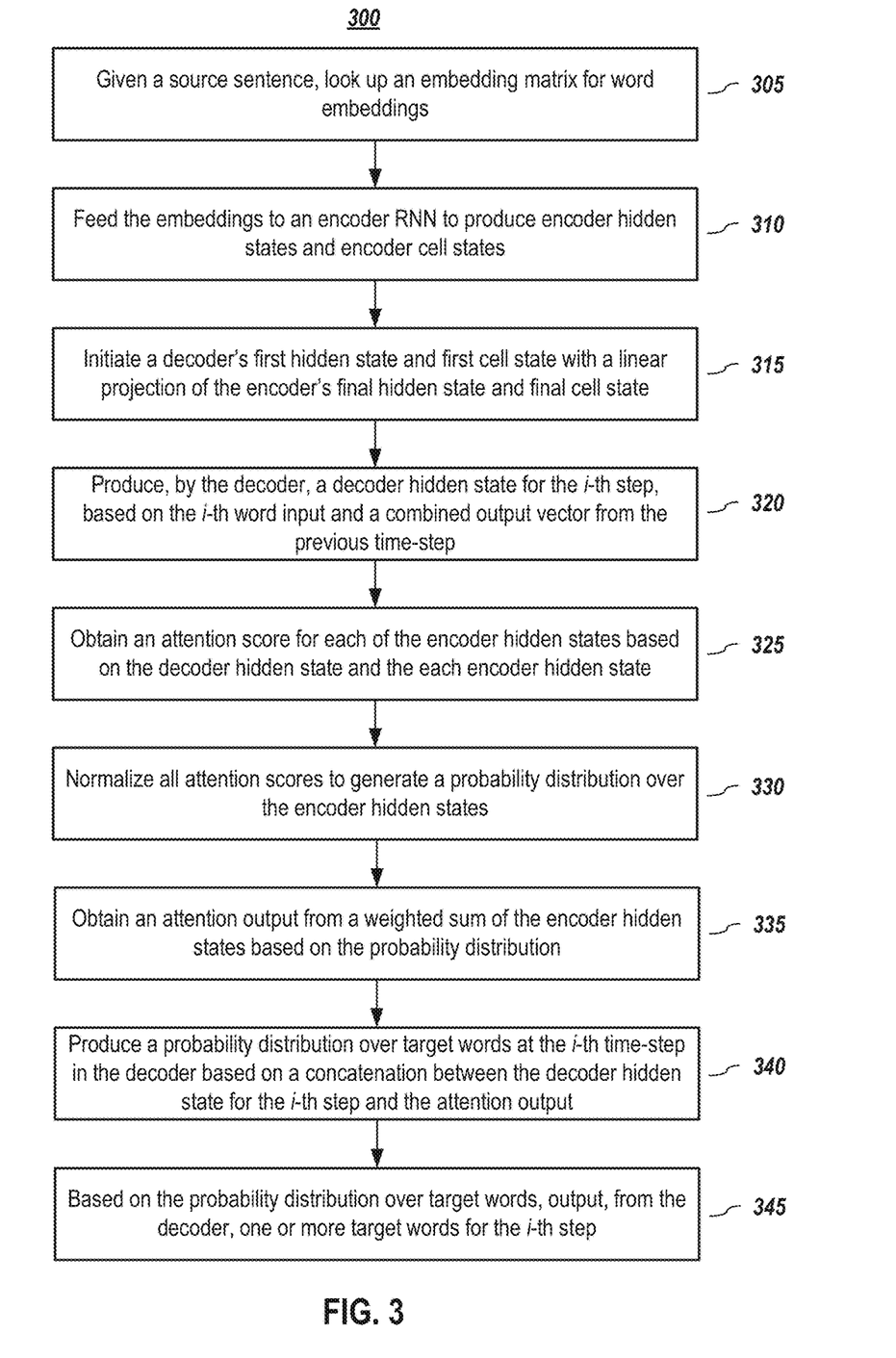
FIG. 3 depicts a process for NMT with attention mechanism, according to embodiments of the present disclosure.

FIG. 2 depicts an NMT model incorporated with attention mechanism and FIG. 3 depicts the process for NMT for such a model, according to embodiments of the present disclosure. Given a source sentence 205, e.g., an Openconfig XPath, word embeddings are looked-up (305) from an embeddings matrix. The embeddings are fed (310) to the encoder RNN 110, e.g., a bidirectional LSTM network, to produce encoder hidden states and encoder cell states. In one or more embodiments, the encoder hidden states and the encoder cell states are concatenated respectively from hidden states and cell states for both forward and backward directions.

In one or more embodiments, the decoder's first hidden state and first cell state are initialized (315) with a linear projection of the encoder's final hidden state and final cell state 215.

On the i-th step in the decoder 220, the decoder produces (320) a decoder hidden state for the i-th step, e.g., the hidden state 224 on the $6^{th}$ step, based on the i-th word input (e.g., the $6^{th}$ word input 223 from the decoder) and a combined output vector from the previous time-step (e.g., the $5^{th}$ combined output vector 222 from the decoder). In one or more embodiments, the embedding for the i-th word input and the combined output vector from the previous time-step are first concatenated to produce an output prediction for the i-th step. As an example shown in FIG. 2, the output prediction for the $6^{th}$ step is produced based on the combined output vector 222 from the $5^{th}$ step and the $6^{th}$ input word (z'). The output prediction is then fed as an input to the decoder to produce the decoder hidden state for the i-th step, e.g., the hidden state 224 on the $6^{th}$ step.

In one or more embodiments, an attention score 225 for each of the encoder hidden states is obtained (325) based on the decoder hidden state and the encoder hidden state. In one or more embodiments, the attention score is a dot product between the decoder hidden state and a corresponding encoder hidden state.

In one or more embodiments, all attention scores are normalized to generate (330) a probability distribution 230 over the encoder hidden states. An attention output is obtained (335) from a weighted sum of the encoder hidden states based on the probability distribution.

In one or more embodiments, a probability distribution 240 over target words (e.g., Dell OS10 Yang paths) at the i-th time-step in the decoder is produced (340) based on a concatenation between the decoder hidden state for the i-th step and the attention output 235. In one or more embodiments, the concatenation is passed through a linear layer, a Tanh non-linearity and dropout layer to attain a combined-output vector for the i-th step. The probability distribution over target words is obtained based on the combined-output vector for the i-th step.

In one or more embodiments, based on the probability distribution 240 over target words, the decoder outputs (345) one or more target words 245 for the current decoder time step (i-th step). The one or more target words may be selected from the top-1 or top-N target words among the target word vocabulary. Steps 320 to 340 may be repeated until the last time target word is generated by the decoder.

In one or more embodiments, a softmax cross entropy loss between the generated probability distribution and a one-hot vector of the target word at the i-th step may be computed for model training.

Figure 4:
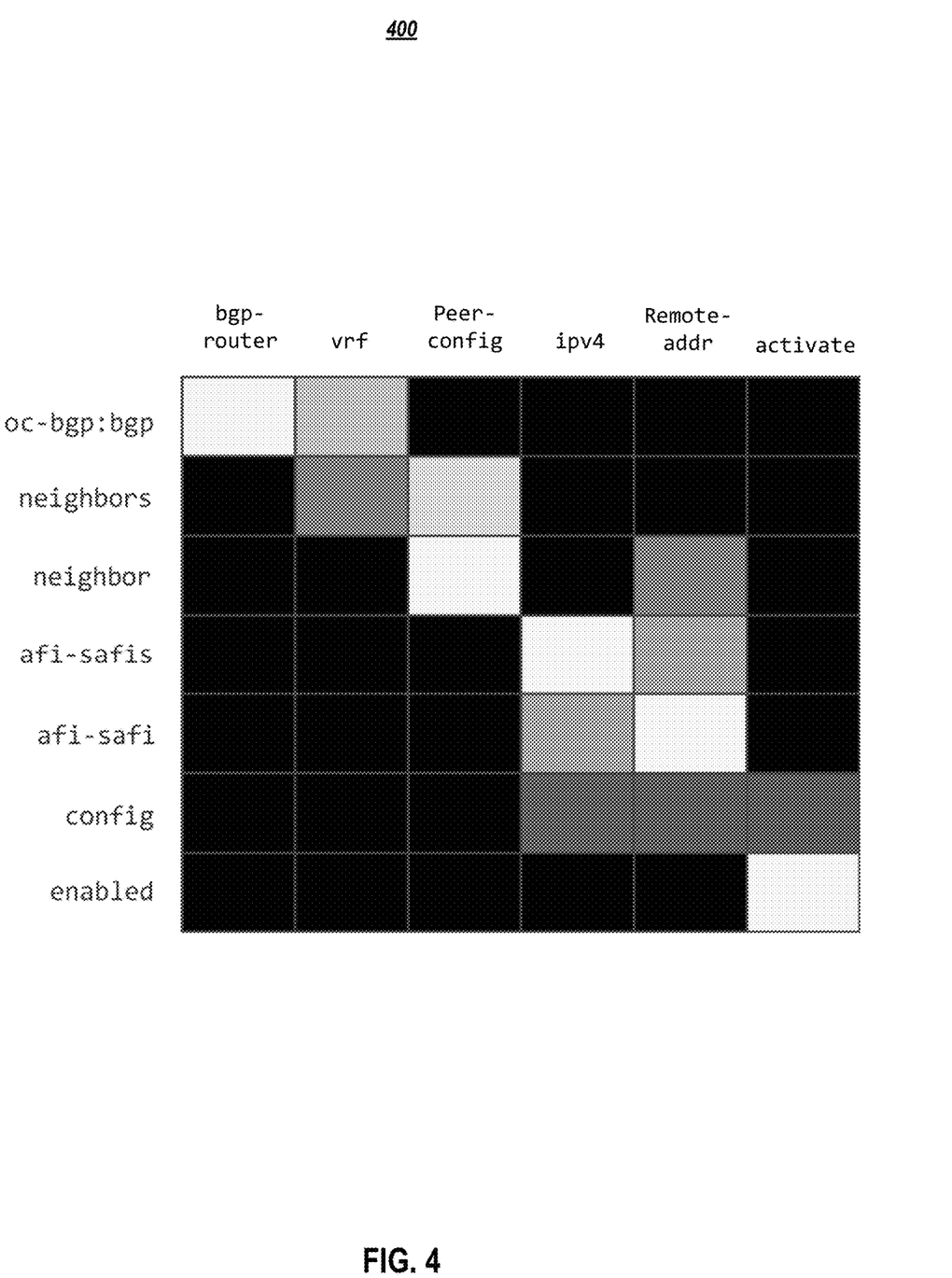
FIG. 4 graphically depicts attention alignment, according to embodiments of the present disclosure.

FIG. 4 is a grey-scale matrix picture showing attention alignment between sample input and output sentences. Brightest block indicates most attention. In order to predict an output word for a time-step, the attention mechanism pays attention to which specific input word tokens. As shown in FIG. 4, the input sentence is "oc-bgp:bgp/neighbors/neighbor/afi-safis/afi-safi/config/enabled", while the predicted sentence is "dell:bgp-router/vrf/peer-config/ipv4/remote-address/activate".

2. Embodiments of Beam Search

A conventional language model (LM) is configured to predict the most likely word, given previous n words. Typically, a conventional LM always starts with a zero vector input to a decoder initially to find the most likely next word (i.e., word with the highest probability). This found word is used to find the following most likely word. The process goes on until the last word is found.

In one or more embodiments of the present disclosure, instead of always starting along with the vector of all zeros, the NMT model takes an output of encoder network that has figured out some representation of the input sentence and feeds it as an input to the decode network. Hence, instead of modeling the probability of any sentence, it is now modeling the probability of output data-model paths (e.g., Openconfig XPaths) conditioned on an input data-model path (e.g., a Dell OS10 NOS XPath).

In one or more embodiments of the present disclosure, instead of sampling target sentences at random, the NMT model maximizes the probability of a target sentence conditioned on an input sentence.

In one or more embodiments, an objective function may be given as:

$$\text{Objective} = \underset{y_1, y_2, \ldots, y_t}{\operatorname{argmax}} \ P(y_1, y_2, \ldots, y_t \mid x) \quad (1)$$

Wherein x is an input sentence comprising t words, given by $x = x_1, x_2, \ldots, x_t$, $P(y_1, y_2, \ldots y_t | x) = P(y_1|x) \cdot P(y_2|x, y_1) \ldots P(y_t|x, y_1, y_2, \ldots y_{t-1})$.

Alternatively, equation (1) may be expressed as:

$$\text{Objective} = \operatorname{argmax} \prod_{i=1}^{t} P(y_i \mid x, y_1, y_2, \ldots, y_{i-1}) \quad (2)$$

Wherein $P(y_1|x)$ is a conditional probability $y_1$ given the input sentence x, $P(y_1, y_2|x)$ is a joint probability given by $P(y_1, y_2|x) = P(y_1|x) \cdot P(y_2|x, y_1)$.

In a typical natural language machine translation, the total number of combinations of words is exponentially large. Given an input sentence having 10 words and a target word dictionary comprising 10,000 words, there are $10,000^{10}$ possible sentences that are 10 words long. For this reason, various approximate search algorithms have been used to cover such huge space of possible sentences.

Greedy search algorithm picks the first most likely word based on conditional LM defined as $P(y_1|x)$, the following most likely word $P(y_2|x, y_1)$ based on first word, and so on. Since greedy search does not take into account the full context, it may not be an optimal choice.

Beam search algorithm defines a beam width, the n most likely words to consider when evaluating the conditional probability of the output sentences. For example, given a vocabulary of 10,000 words, an encoder output is a softmax output representing probability of next likely word for each of 10,000 words summing up to 1. Beam search algorithm with beam width of three picks top 3 words from this list as the most likely choices for the first word in the first decoder step. To evaluate the probability of second word in the output sequence, each of these three choices is used to consider that next word from the full vocabulary of 10,000 words. Therefore, in the second step, there are 3×10,000=30,000 possible two-word combinations to pick from. Again, the beam search algorithm picks the top 3 (since beam width is three) combinations from the 30,000 possibilities. For the third word, these picked three two-word combinations are used to evaluate 30,000 three-word possible combinations. The process continues until the end of output sentence is reached. It may be seen that when the bean width is set as 1, the beam search actually becomes greedy search.

In one or more embodiments of the present disclosure, a constrained beam search algorithm is used to further improve search performance and efficiency. In one or more embodiments, the target model, e.g., an Openconfig model, is a highly structured model with a limited vocabulary, e.g., less than 1,000 words. Furthermore, only certain words may appear in certain positions. Such restrictions may be used to further limit a search scope for the beam search.

Figure 5:
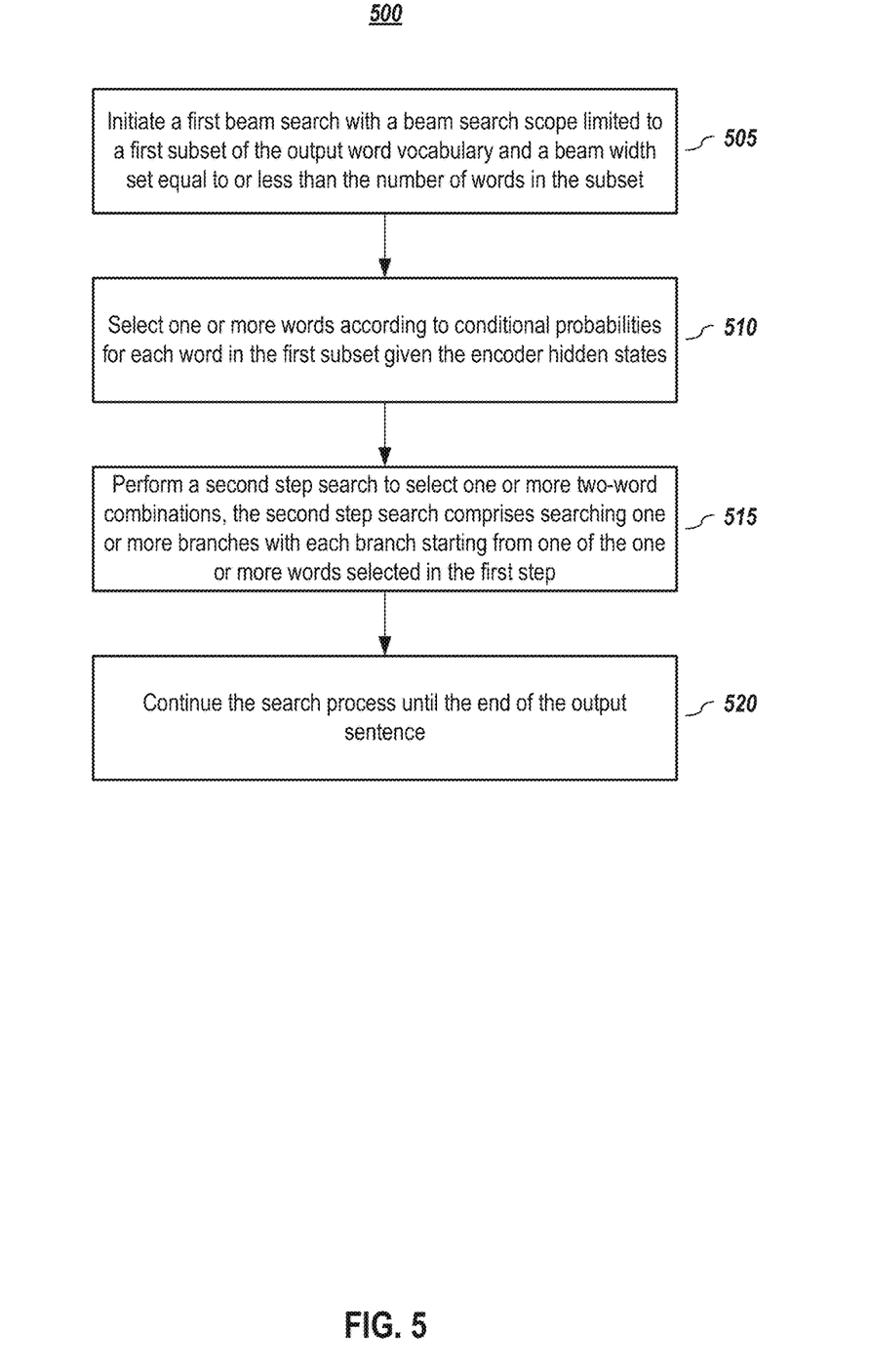
FIG. 5 depicts a process for beam search using variable beam width in NMT, according to embodiments of the present disclosure.

FIG. 5 depicts a process for beam search using a variable beam width in NMT, according to embodiments of the present disclosure. Initially, the NMT model initiates (505) a first beam search with a beam search scope limited to a first subset of the output word vocabulary, instead of the whole vocabulary, and a beam width for a first step set equal to or less than the number of words in the subset. For example, in an Openconfig target model, there are only 25 words that may be used as the first word for Openconfig model name in an Openconfig XPath. The beam width for the first step is chosen as 25 or less with the search scope limited to those 25 words. After the first search step, one or more words are selected (510) according to conditional probabilities for each word in the first subset given the encoder hidden states of the source expression. The number of words selected is equal to the beam width for the first step.

In one or more embodiments, after selecting one or more words in the first step, the NMT model performs (515) a second step search to select one or more two-word combinations. The second step search comprises searching one or more branches with each branch defined by and started from one of the one or more words selected after the first step.

In one or more embodiments, the one or more branches share a search scope for the second step search, which may be a second subset of the output word vocabulary instead of the whole vocabulary. In one or more embodiments, the second subset is different from the first subset, and may even have no overlap with the first subset.

In one or more embodiments, the one or more search ranches may have different search scopes from each other. Each branch may have its own branch search scope, or branch vocabulary. These branch vocabularies may or may not have overlap from each other.

In one or more embodiments, the one or more two-word combinations are selected according to joint probabilities for each two-word combination searched during the second step search. The number of two-word combination selected is defined by a beam width predetermined for the second step search. In one or more embodiments, the beam width for the second step search is different from the beam width for the first step search. In one or more embodiments, the beam width for the second step search may be determined according to total search scope for the second step search and may be inversely related to the size of the total search scope. For example, if the sum of search scopes for all branches is a big number, the beam width for the second step search may be pre-set as a small number, such that a good balance of search efficiency and processing cost may be achieved. While on the other hand, if the sum of search scopes for all branches is relatively small, the beam width for the second step search may be pre-set as a larger number, such that more options may be explored without excessive processing cost.

For example, to generate a target sentence in an Openconfig model for a given input sentence, an NMT model first picks three $y_1$ words oc-bgp, oc-lldp, and oc-vlan as the three Openconfig model names in the first step search using a beam width of 3. The three words oc-bgp, oc-lldp, and oc-vlan represent respectively a border gateway protocol (BGP), a link layer discovery protocol (LLDP), and a virtual local access network (VLAN) Openconfig models. In a second step search, the NMT model calculate joint probability of $y_1\&y_2$ as follows:

$$y_1=\{oc\text{-}bgp, oc\text{-}lldp, oc\text{-}vlan\} \quad (3)$$

$$a=P(\text{``}oc\text{-}bgp\text{''}, y_2|x)=P(\text{``}oc\text{-}bgp\text{''}|x) \cdot P(y_2|x, \text{``}oc\text{-}bgp\text{''}) \quad (4)$$

$$b=P(\text{``}oc\text{-}lldp\text{''}, y_2|x)=P(\text{``}oc\text{-}lldp\text{''}|x) \cdot P(y_2|x, \text{``}oc\text{-}lldp\text{''}) \quad (5)$$

$$c=P(\text{``}oc\text{-}vlan\text{''}, y_2|x)=P(\text{``}oc\text{-}vlan\text{''}|x) \cdot P(y_2|x, \text{``}oc\text{-}vlan\text{''}) \quad (6)$$

In the example, objective for the second step search may be given by:

$$\text{Objective} = \underset{y_2}{\text{argmax}} \ (a, b, c)$$

Here a, b, c correspond to three branches for search in the second step search. Each branch may or may not have the same search scope. After the second step search is done, one or more two-word combinations are selected according to joint probabilities for every two-word combination of the three branches.

Such a search process continues (520) until the end of the output sentence.

In one or more embodiments of the present disclosure, depending on the search step, a large set of words from the vocabulary may be eliminated. Accordingly, the sample space of possible combinations may be reduced to a manageable number without accuracy cost. Such an approach enables a unique beam width for a given output step to get the best result at minimum processing cost.

Conventionally, bean width is fixed for all steps and even though beam search may run faster than breadth first search (BFS) or depth first search (DFS), it may not be guaranteed to find exact maximum for $$\underset{y}{\text{argmax}} \ P(y|x).$$

On the contrary, embodiments of the present disclosure use a modified beam search algorithm to speed up the process and achieve better results of finding an optimum or near optimum maximum for $$\underset{y}{\text{argmax}} \ P(y|x).$$

3. Some Evaluation Results

It shall be noted that these evaluations and results are provided by way of illustration and were performed under specific conditions using a specific embodiment or embodiments; accordingly, neither these experiments nor their results shall be used to limit the scope of the disclosure of the current patent document.

In one or more evaluations, human transformation of input Openconfig paths was used for ground-truth labels. It was found that embodiments of present NMT models performed very well as compared to human transformation. Using the top-3 results from the output probability distribution, it was found that 90% of the input paths are mapped to one of the top-3 predictions. It demonstrates that embodiments of the NMT model may be used in a recommender system for target Yang model auto-generation based on the desired input Yang model.

Using embodiments of the present disclosure, the tedious job of manually mapping input yang model paths to desired yang model paths may be greatly reduced. Incorrectly mapped output paths can be manually rectified during testing phase.

Embodiments of the present disclosure may provide an additional benefit of consistency check with respect to a model pair. For example, given a feature Yang model, if the target paths are unimplemented, an NMT system may imprint on an input Yang model (or a Language Model in general) and produce consistent output paths for a target Yang model.

4. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price.

The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 6:
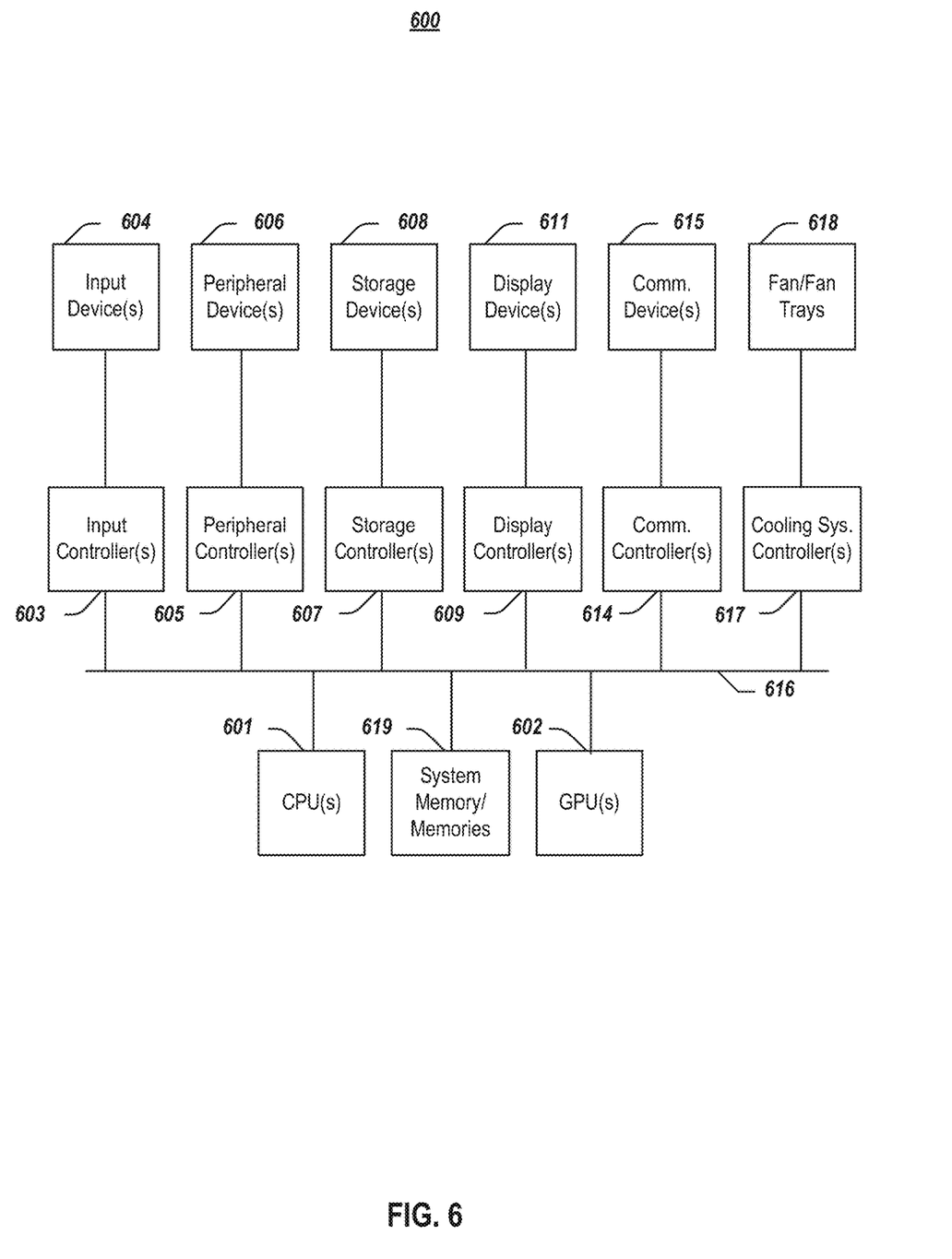
FIG. 6 depicts a simplified block diagram of an information handling system, according to embodiments of the present disclosure.

FIG. 6 depicts a simplified block diagram of an information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like and may also include one or more graphics processing units (GPU) 602 and/or a floating-point coprocessor for mathematical computations. In one or more embodiments, one or more GPUs 602 may be incorporated within the display controller 609, such as part of a graphics card or cards. The system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for neural machine translation comprising:
    encoding, using an encoder, a source expression into a sequence of encoder hidden states, the source expression comprising one or more words;
    generating, using a decoder, decoder hidden states conditioned at least on the sequence of encoder hidden states, the decoder uses beam search comprising multiple search steps for target words of a target model, the beam search has a variable beam width and a variable search scope within a target word vocabulary during the multiple search steps, in which the variable search scope within the target word vocabulary is constrained for at least one or more of search steps of the multiple search steps to exclude target words that cannot appear at a current position in a target expression for a current search step based upon the target model or to include target words that can appear at the current position in the target expression for the current search step based upon the target model;
    producing, from an output prediction layer, a probability distribution among target words searched for each of the multiple search steps; and
    generating, using the probability distribution for each of the multiple search steps, one or more target expressions corresponding to the source expression after the multiple search steps, each of one or more the target expressions comprising one or more target words.

2. The computer-implemented method of claim 1 wherein in a first search step of the multiple search steps, a search scope for the first search step is limited to a first subset of the target word vocabulary, the subset comprising one or more target words, the decoder sets the beam width for the first search step equal or less than a number of target words in the first subset.

3. The computer-implemented method of claim 2 wherein one or more target words are selected after the first search step according to a probability distribution among the one or more target words in the first subset, the number of target words selected is determined by the beam width for the first search step.

4. The computer-implemented method of claim 3 wherein in a second search step of the multiple search steps, the decoder searches one or more branches with each branch defined by and started from one of the one or more words selected after the first search step, the decoder selects one or more two-word combinations according to the beam width for the second search step, the beam width for the second search step is different from the beam width for the first search step.

5. The computer-implemented method of claim 4 wherein the beam width for the second search step is predetermined according to a search scope for the second search step and is inversely related to vocabulary size of search scope for the second search step.

6. The computer-implemented method of claim 4 wherein the search scope for the second search step is limited to a second subset of the target word vocabulary, the second subset is shared across the one or more branches and different from the first subset.

7. The computer-implemented method of claim 4 wherein during the second search step, each of the one or more branches has its own branch search scope.

8. The computer-implemented method of claim 1 wherein the source expression is an extensible markup language (XML) path language (XPath) for a first network operation system (NOS), the target expression is an XPath for a second NOS.

9. A system for neural machine translation comprising:
    one or more processors; and
    a non-transitory computer-readable medium or media comprising one or more sets of instructions which, when executed by at least one of the one or more processors, causes steps to be performed comprising:
        encoding a source expression into a sequence of encoder hidden states, the source expression comprising one or more words;
        generating decoder hidden states conditioned at least on the sequence of encoder hidden states using beam search comprising multiple search steps for target words of a target model, the beam search has a variable beam width and a variable search scope within a target word vocabulary during the multiple search steps, in which the variable search scope within the target word vocabulary is constrained for at least one or more of search steps of the multiple search steps to exclude target words that cannot appear at a current position in a target expression for a current search step based upon the target model or to include target words that can appear at that the current position in the target expression for the current search step based upon the target model;
        producing a probability distribution among target words searched for each of the multiple search steps; and
        generating, using the probability distribution for each of the multiple search steps, one or more target expressions corresponding to the source expression after the multiple search steps.

10. The system of claim 9 wherein the source expression is an extensible markup language (XML) path language (XPath) for a first network operation system (NOS), the target expression is an XPath for a second NOS.

11. The system of claim 9 wherein in a first search step of the multiple search steps, a search scope for the first search step is limited to a first subset of the target word vocabulary, the subset comprising one or more target words, a decoder sets the beam width for the first search step equal or less than a number of target words in the first subset.

12. The system of claim 11 wherein one or more target words are selected after the first search step according to a probability distribution among the one or more target words in the first subset, the number of target words selected is determined by the beam width for the first search step.

13. The system of claim 12 wherein in a second search step of the multiple search steps, the decoder searches one or more branches with each branch defined by and started from one of the one or more words selected in the first search step, the decoder selects one or more two-word combinations according to the beam width for the second search step, the beam width for the second search step is different from the beam width for the first search step.

14. The system of claim 13 wherein the beam width for the second search step is predetermined according to search scope for the second search step and is inversely related to vocabulary size of search scope for the second search step.

15. The system of claim 13 wherein the search scope for the second search step is limited to a second subset of the target word vocabulary, the second subset is shared across the one or more branches and different from the first subset.

16. The system of claim 13 wherein during the second search step, each of the one or more branches has its own branch search scope.

17. A non-transitory computer-readable medium or media comprising one or more sequences of instructions which, when executed by at least one processor, causes steps for neural machine translation be performed comprising:
  encoding, using an encoder, a source expression into a sequence of encoder hidden states, the source expression comprising one or more words;
  generating, using a decoder, decoder hidden states conditioned at least on the sequence of encoder hidden states, the decoder uses beam search comprising multiple search steps for target words of a target model, the beam search has a variable beam width and a variable search scope within a target word vocabulary during the multiple search steps, in which the variable search scope within the target word vocabulary is constrained for at least one or more of search steps of the multiple search steps to exclude target words that cannot appear at a current position in a target expression for a current search step based upon the target model or to include target words that can appear at the current position in the target expression for the current search step based upon the target model;
  producing, from an output prediction layer, a probability distribution among target words searched for each of the multiple search steps; and
  generating, using the probability distribution for each of the multiple search steps, one or more target expressions corresponding to the source expression after the multiple search steps, each of one or more the target expressions comprising one or more target words.

18. The non-transitory computer-readable medium or media of claim 17 wherein the multiple search steps comprise a first search step with a search scope for the first search step limited to a first subset of the target word vocabulary, the subset comprising one or more target words, the beam width for the first search step is set equal or less than the number of target words in the first subset, a number of target words selected is determined by the beam width for the first search step.

19. The non-transitory computer-readable medium or media of claim 18 wherein the multiple search steps comprise a second search step, in which one or more branches are searched, each branch is defined by and started from one of the one or more words selected after the first search step, one or more two-word combinations are selected according to the beam width for the second search step, the beam width for the second search step is different from the beam width for the first search step.

20. The non-transitory computer-readable medium or media of claim 18 wherein the beam width for a second search step is predetermined according to search scope for the second search step and is inversely related to vocabulary size of search scope for the second search step.

* * * * *